United States Patent [19]
Tibbetts et al.

[11] 3,877,128

[45] Apr. 15, 1975

[54] METHOD OF PRODUCING A FINNED TUBE HEAT EXCHANGER

[75] Inventors: Alan R. Tibbetts, Costa Mesa; Donald R. Tucker, Lakewood, both of Calif.

[73] Assignee: Airco, Inc., New York, N.Y.

[22] Filed: Feb. 21, 1973

[21] Appl. No.: 334,496

Related U.S. Application Data

[62] Division of Ser. No. 224,320, Feb. 7, 1972, Division of Ser. No. 792,593, Jan. 21, 1969, Pat. No. 3,672,446.

[52] U.S. Cl. ............ 29/157.3 A; 29/514; 113/118 A
[51] Int. Cl. ........................ B21d 53/02; B23p 15/26
[58] Field of Search ........... 29/157.3 A, 514; 62/52; 113/118 A; 165/183, 185, 179; 285/373, 419

[56] References Cited
UNITED STATES PATENTS

| | | | |
|---|---|---|---|
| 2,405,722 | 8/1946 | Villier | 165/183 X |
| 2,721,582 | 10/1955 | Hoke | 285/419 X |
| 2,737,370 | 3/1956 | Frisch et al. | 29/157.3 A X |
| 3,216,095 | 11/1965 | Kurtz et al. | 113/118 R |
| 3,231,298 | 1/1966 | Tomb et al. | 285/373 X |
| 3,280,907 | 10/1966 | Hoffman | 165/185 |
| 3,407,874 | 10/1968 | Gier | 29/157.3 B X |
| 3,460,613 | 8/1969 | Kritzer | 29/157.3 D X |

FOREIGN PATENTS OR APPLICATIONS

| | | | |
|---|---|---|---|
| 38,249 | 4/1931 | France | 165/183 |
| 304,892 | 1/1929 | United Kingdom | 113/118 A |
| 881,184 | 5/1953 | Germany | 285/419 |

*Primary Examiner*—C. W. Lanham
*Assistant Examiner*—D. C. Reiley, III
*Attorney, Agent, or Firm*—Roger M. Rathbun; Edmund W. Bopp; H. Hume Mathews

[57] ABSTRACT

A finned assembly for a heat exchanger comprising an extended surface portion, an elongated tubular member, said extended surface portion comprising two identical parts, each having an internal cylindrical surface adapted to engage said tubular member and each having radially extending locking members adapted to engage locking members on the other of said parts. The disclosure further relates to methods and apparatus for attaching said extended surface portion to said member.

2 Claims, 12 Drawing Figures

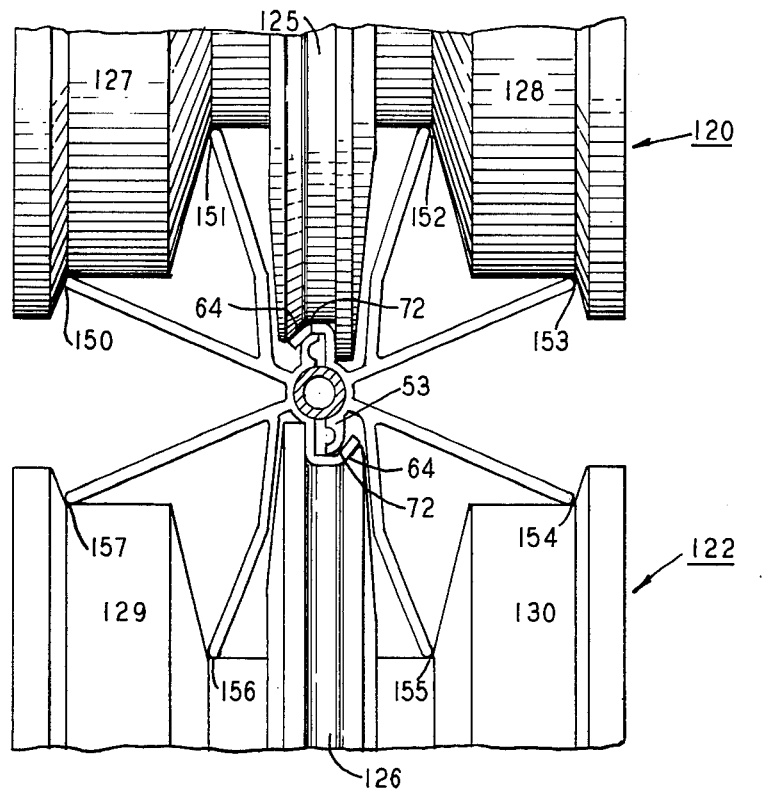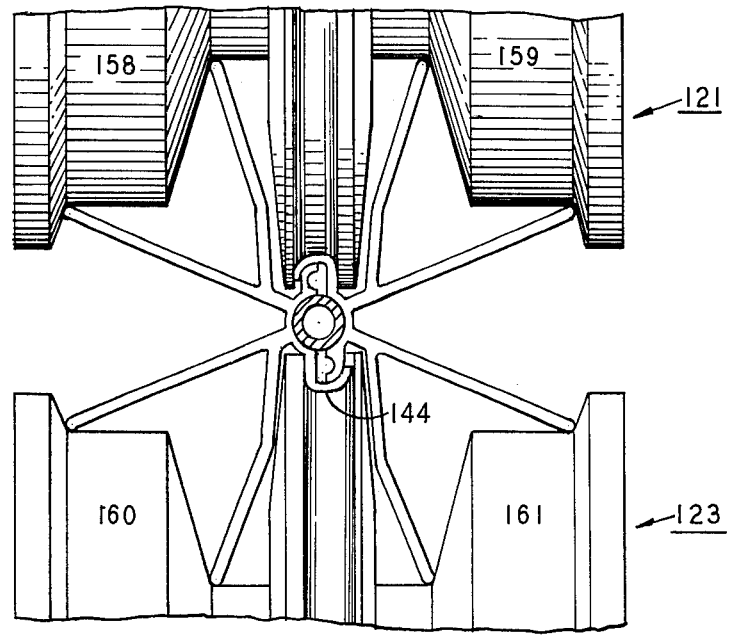

METHOD OF PRODUCING A FINNED TUBE HEAT EXCHANGER

This is a division of application Ser. No. 224,320, filed Feb. 7, 1972, which in turn was a division of application Ser. No. 792, 593, filed Jan. 21, 1969, now issued as U.S. Pat. No. 3,672,446.

This invention relates to an improved form of ambient air vaporizer made of dissimilar materials which are joined together without welding. The vaporizer constructed according to the invention is capable of withstanding high vapor pressure and has excellent heat transfer characteristics.

The use of various forms of ambient air vaporizers is well known in the cryogenic industry. The ambient air vaporizers are known to take the form of aluminum castings in the form of blocks which may be interconnected for the passage of the cryogenic fluid being heated. In another well known construction the vaporizer takes the form of elongated sections of extended surface material which are formed from aluminum extrusions. Extrusions are generally star-shaped with a plurality of radially extending fins and with a central opening through which the cryogenic fluid passes. The extrusion is usually made from aluminum alloy 6063-T1 and the extrusion is made in an elongated length which is then cut up into desired lengths. In its most common form the extrusions are placed in a block with 4 sections on a side and each section is interconnected with the next in a series of parallel or combination thereof (as desired) arrangement by means of bent tubing which is welded to interconnect the central openings of the aluminum extrusions so that fluid may be transmitted into one end of the extrusion and through the opening which passes through the interior of the extrusion and then out the other end through the exit tubing. The exit tubing is serially connected by welding to an adjacent extrusion and the cryogenic liquid is thereby passed from one section to the next until it has passed through all 16 sections. Such ambient air vaporizers are often used with customer stations which include a liquid storage tank in which the liquified gas is stored, and a high pressure liquid pump which pulls the suction on the liquid storage tank and directs the high pressure liquid output to the ambient air vaporizer. The vaporizer may take the form of any of the vaporizers discussed above and may of course also take the form of the invention as it will be described in more detail hereinbelow. From the vaporizer the gaseous product is directed to a use point such as for example a steel mill, aluminum remelt furnace or perhaps be directed into a gas cylinder filling manifold. In order to assist in the heat transfer process a blower may be placed so that it directs ambient air across the vaporizer. The necessity for such a blower would of course depend upon the rate of vaporization desired and the climactic conditions involved.

In the prior art form of ambient air vaporizer which may be described for purposes of discussion as the star type, it has been found that numerous instances of failure of the critical welds have occurred. The failures occur due to the fact that the tubing which connects the vaporizer sections must be welded to the ends of the vaporizer sections in such a manner so as to withstand thousands of pounds of pressure. In general the tubing interconnecting the vaporizer sections is made of bent aluminum tubing and the vaporizer sections themselves are made of extruded aluminum. The welds joining these two elements must therefore be made with a high degree of skill so as to be entirely fluid tight and so as to be able to withstand high internal vapor pressure. In a conventional customer station a normal anticipated pressure of 3,000 psi or more is reached in the vaporizer. In the most commonly used ambient air vaporizer bank 16 sections are utilized. It is therefore apparent that at least 32 welds are required to join and interconnect the tubing with the extruded sections. As mentioned above each individual weld must be carefully made and must then be closely inspected and hydrotested in order that it be able to withstand the rigors of cryogenic service. It is evident that the degrees of expansion and contraction of dissimilarly shaped metal parts vary. Thus as the low temperature cryogenic liquid which for purposes of example might be liquid nitrogen at −320°F, flows through the tubing and through the extruded sections, the various parts of the ambient air vaporizer will contract at various rates. This will cause the welds which interconnect the various portions to be placed under additional stresses. The ambient air vaporizers are often cyclicly utilized and the stresses and strains which are undergone by the welds interconnecting the portions can often cause failure of the welds. Thus the technique of welding the sections to the interconnecting piping has been found to be an extremely costly method of manufacture and has further been found to produce an unreliable product.

Thus it has been found that although the prior art form of ambient air vaporizer is widely used in the field, it embodies various structural and design concepts which leave much to be desired.

This invention relates to a heat exchanger structure and to a method and apparatus for manufacturing the same which alleviates all of the above-mentioned defects in the prior art form of ambient air vaporizer. It is an object of the present invention to provide an ambient air vaporizer utilizing extruded aluminum extended fin surfaces coupled to a stainless steel conduit which passes through the extended fin section. It is a further object of the present invention to couple the extruded aluminum sections to the stainless steel tubing without any welds.

It is a further object to the invention to couple the aluminum extrusions to the interior tubing in a manner so as to allow the dissimilar materials to expand and contract without affecting the operation of the vaporizer in any way.

It is a further object of the present invention to provide an improved fin arrangement for an extended surface ambient air vaporizer.

It is a further object of the present invention to provide identical extrusions which may be locked around a conduit adapted to carry cryogenic liquid which is to be vaporized. Each identical extruded section carries a locking device which may be coupled to another identical section in a manner so as to prevent the sections from becoming unlocked.

It is a further object of the present invention to provide a method for locking an extended surface section or sections about a liquid or fluid carrying conduit.

It is a further object of the present invention to provide a method and apparatus for locking identical sections of extruded aluminum extended surface material about an elongated conduit.

Other and further objects of this invention will become apparent to those skilled in this art from the following detailed description on the annexed sheets of drawings, which by way of preferred example, illustrate several embodiments of the invention.

In the drawings.

FIG. 9 is an end view, partly in section, partly broken away, of the vaporizer sections and conduit being locked together in a first locking operation in a first set of forming rolls.

FIG. 10 is an end view, partly in section, partly broken away, of a second set of forming rolls completing the locking of the extruded aluminum sections to the tubular conduit.

Figure 1:
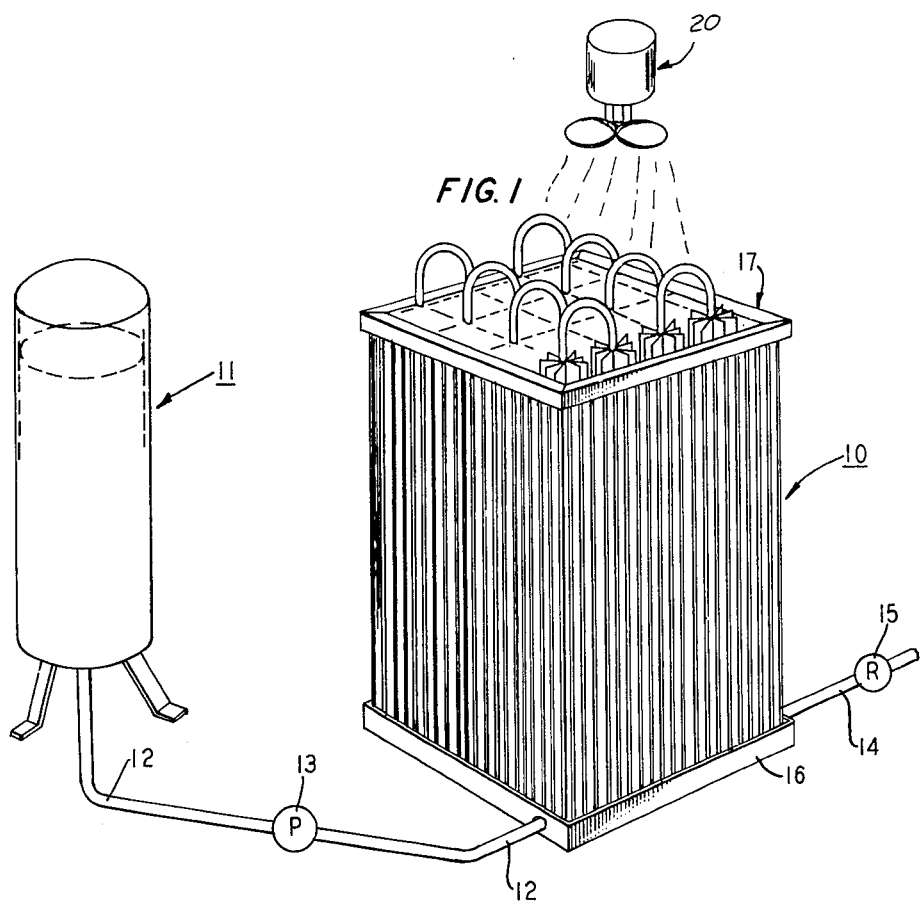
FIG. 1 is a view partly in perspecitve of an ambient air vaporizer coupled with a schematic showing of a conventional customer station.

In FIG. 1 there is illustrated an ambient air vaporizer bank 10 which is connected to a cryogenic storage tank 11 by means of conduit 12. A pump 13 suitable for pumping a cryogenic liquid forces high pressure cryogenic liquid into the ambient air vaporizer bank 10. If the storage tank 11 contains for example liquid nitrogen, the temperature of the nitrogen entering the ambient air vaporizer bank is approximately −320°F. The cryogenic liquid passes serially through the sections of the bank 10 wherein the liquid is vaporized and the resulting vapor exits through conduit 14. The delivery pressure of the cryogenic vapor is normally controlled by a pressure regulator 15 and both the storage tank 11 and the delivery conduits 12 and 14 are normally supplied with conventional relief valves, shut-off valves and coupling connections which are not shown. In a typical nitrogen customer station the pumping system and vaporizer are capable of supplying 5,000 SCFH at 3,000 psi to the use point. The size of the vaporizer 10, pump 13 and storage tank 11 would of course depend upon the amount of vapor that must be delivered to the use point. The illustration in FIG. 1 is not to scale. Persons skilled in the art will recognize that normally the storage tank is considerably larger than the vaporizer structure. The vaporizer bank is normally enclosed in a framework indicated generally by the reference numerals 16 and 17. In the prior art form of ambient air vaporizer, the fins of the vaporizer sections were directly connected to the frameworks 16 and 17 in order to structurally mount the bank in the framework. As will be discussed in greater detail below, the present invention calls for connecting the tubing to the frameworks 16 and 17. This greatly strengthens the entire vaporizer bank 10 in view of the fact that the stainless steel tubes are directly connected to the steel housings 16 and 17.

Depending upon the desired output of the ambient air vaporizer bank 10 it may be necessary to install a blower indicated by the reference number 20 to blow ambient air over the vaporizer bank. By forcing air over the vaporizer bank, additional output of the vaporizer may be obtained.

The details of the storage tank 11, which is normally vacuum insulated, and of the pumping system 13 are not provided in this disclosure in that they form no part of the present invention and in view of the fact that many different types of tanks and pumping systems are available commercially.

Figure 2:
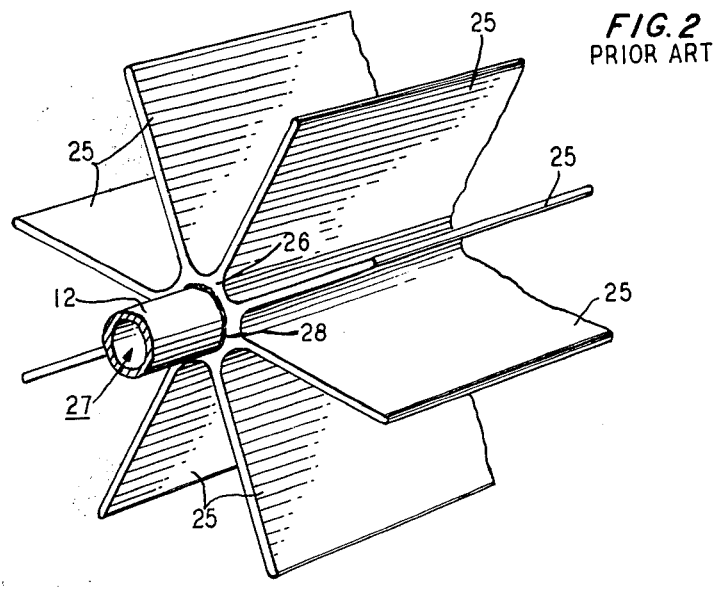
FIG. 2 is a perspective view, partly broken away, partly in section of a conventional ambient air vaporizer section made of extruded aluminum.

In FIG. 2 there is illustrated a perspective view of a conventional ambient air vaporizer section coupled in the conventional fashion to aluminum tubing by a continuous annular weld 28. In the conventional star type vaporizer there are 8 radially extending fins 25 which emanate from a central annular hub 26 having a hollow interior 27. This structure is normally extruded aluminum. The cryogenic liquid passes in the first instance from the conduit 12 into the interior 27 wherein it is warmed up as it passes through the extruded section. Note that the star configuration provides a large surface area per unit of length of the section thus resulting in high heat transfer to the cryogenic liquid. Upon the completion of welding the tubing to the extrusion the weld must be stress-relieved in the conventional manner by a heating process or extremely heavy-walled tubing must be employed. Similarly, a conduit comparable to conduit 12 is connected to the other end of the section and is welded in the same manner as discussed above in connection with weld 28. Thus a weld must be made at each end of the vaporizer section. If the vaporizer bank contains 16 vaporizer sections, at least 32 welds will have to be made to interconnect the sections with suitable tubing. To withstand the high vapor pressure, the wall thickness of the aluminum tubing must be considerably thicker than the wall thickness of stainless steel tubing designed to withstand a comparable pressure.

Figure 3:
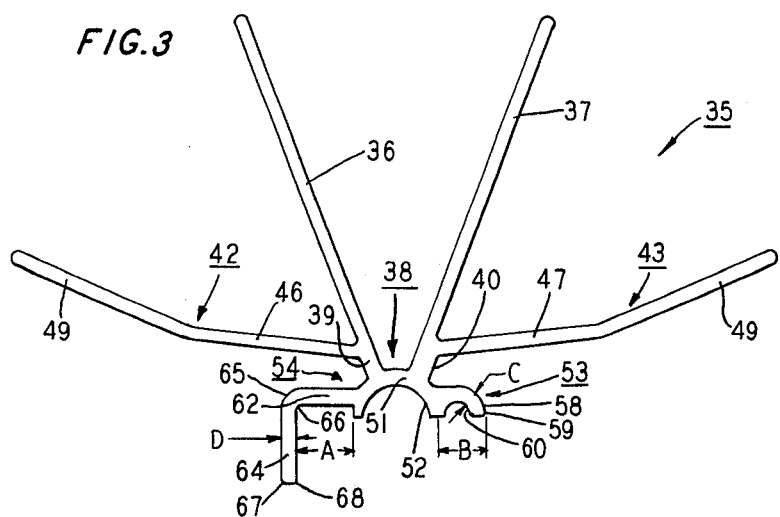
FIG. 3 is an end view of an extrusion formed in accordance with the preferred form of the invention.

In FIG. 3 there is illustrated an end view of one part of an ambient air vaporizer section built in accord with the preferred form of the invention. The part which is indicated by the reference numeral 35 is formed of extruded aluminum and is normally used in standard lengths of 6 feet. The part comprises a pair of radially extending fins 36 and 37 which are connected to a central hub 38 by means of fin portions 39 and 40 respectively. The fin portions 39 and 40 are of a greater thickness than the fin portions 36 and 37 in that they support fins 36 and 37 and fins 42 and 43. The extra thickness also provides improved heat transfer characteristics.

The fins 42 and 43 have been formed as an extension of fins 36 and 37 due to the fact that the portion of the hub 38 which would normally support the fins 42 and 43 is now used to support locking members which will now be described.

Each of the fins 42 and 43 is made of two parts, a radial part 48, 49 and an offset part 46, 47. The radial part lies along a radius extending from the longitudinal axis of the vaporizer section and the offset portion diverges from the radius and is interconnected with the adjacent fin 36 or 37. It can be observed from FIG. 3 that the included angle between fins 36 and 37 is 45° and the included angle between fin 37 and the radial part 49 of fin 43 is also 45°. The same may be said for the radial part of fin 42 and the fin 36. The angle between the radial fins 36, 37 and offset part 47, 46 is preferably as close to 45° as possible without interfering with the locking members before, during or after the forming process.

It has been found that an angle of 45° between adjacent fins on an ambient air vaporizer is preferred due to the fact that the frost build-up which inevitably occurs on the fin surfaces does not bridge over between adjacent fins when the angle is approximately 45°. If the included angle between the fins is less than about 40°, it has been found that the frost bridges between the two fins starting at the root of the angle and then proceeding radially outwardly. A frost build-up of course substantially reduces the desired heat transfer characteristics of the air vaporizer. If the included angle is greater than approximately 45°, the number of fins and thus the surface area must be reduced.

The hub 38 comprises a substantially annular portion 51 with an interior partly cylindrical surface 52. Projecting from the annular member 51 but formed integral therewith are a pair of locking members 53 and 54. The locking member 53 will be described as the short locking member and the member 54 described as the long locking member in the interest of defining the invention. The short locking member 53 takes in part the form of a partly cylindrical surface 58. The surface 58 preferably has an approximately 90° arc. The outermost end of the locking member 53 is rounded off at 59 and this somewhat diminishes the said arc, and the purpose for this will be discussed below. The locking member 53 further comprises an interior partially cylindrical surface 60 which is concentric with the cylindrical surface 58. The radius defining the cylindrical surface 60 is preferably 1/2 the radius defining the cylindrical surface 58. As shown in FIG. 3, the partially cylindrical surface 60 has a 180° arc.

The long locking member 54 is also formed from an extension of the hub 38 and is integral therewith. The last-mentioned locking member includes a base portion 62 which extends in preferably the opposite direction from the extension defined by the locking member 53. The base member 62 is slightly longer than the total extension of the fixed locking member 53 as indicated by the fact that the dimension A shown on FIG. 3 is greater than the comparable dimension B. The reason for this will be discussed below.

The outer portion 64 of the locking member 54 is formed at 90° to the base member 62 during the extrusion process. The interconnection between the outer member 64 and the base member 62 is formed with rounded surfaces 65 and 66 in order that the outer member 64 may be bent inwardly toward the hub 38 without the interconnection fracturing or otherwise failing. In the preferred form of the invention the outer member 64 is formed slightly longer than the base member 62. Note that the outermost extremities of the outer member 64 are also rounded off 67, 68. It has been found that by rounding surfaces of aluminum which is to be bent or otherwise shaped, metal failures are often avoided.

It is to be noted that the interior cylindrical surface 52 of the hub 38 is formed with a cylindrical surface which is less than one half the full cylindrical surface (less than a 180° arc). The reasons for thus forming the surface 52 will be described below in connection with the assembly of the extruded parts and the conduit tube.

Figure 4:
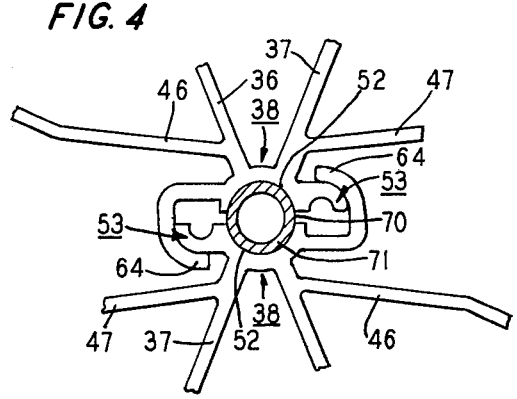
FIG. 4 is an end view, partly in cross section, partly broken away showing a pair of identical extrusions locked to a conduit in accordance with the preferred form of the invention.

By utilizing two identical vaporizer parts as illustrated in FIG. 3 and by positioning the two parts in the manner which will now be described about a fluid carrying conduit composed of a similar or dissimilar metal and by interlocking the locking members of the two identical parts a unitary ambient air vaporizer section may be formed without the necessity for making any welds. The end product is illustrated in FIG. 4. By mating the cylindrical surfaces 52 of the separate parts with the exterior cylindrical surface 70 of the conduit 71 and by bending over the outer members 64 of the long locking member to engage the short locking member 53 of the opposite part, the two identical parts may be affixed in good heat transfer relationship to the conduit 71.

The apparatus for accomplishing this step will be discussed in detail below. The bending or forming actually takes place in the two-stage forming rolls in one operation. In the first stage the outer member 64 is bent at a 45° angle with respect to the base member 62. This brings the inner surface 72 of the outer member 64 of one part in contact with the arcuate surface 58 of the fixed locking member 53 of the other part. In a subsequent forming stage the outer member 64 is forced still further inwardly toward the base member 62. The first-forming step is illustrated clearly in FIG. 9 and the second-forming step is indicated in FIG. 10. By forcing the locking member 64 even further inward in the second step it is caused to conform to the exterior curved surface 58 of the fixed locking member 53. This results in the clamping of the parts together about the tubing or conduit 71 and causes the cylindrical surfaces 52 to conform to the exterior cylindrical surface 70 of the conduit 71. By having these surfaces conform to one another and by causing substantially complete contact between the surfaces 52 and 70 throughout the length of the section optimum heat transfer characteristics are realized.

In forming the interior partly cylindrical surface of the hub 38 a radius is utilized which slightly exceeds the radius of the external cylindrical surface of the tubing or conduit 71. For example, if the radius of the tubing is 0.625 inches the radius of the hub will be approximately 0.65 inches. This is done for a number of reasons. Due to the nature of the extrusion process tolerances on extruded parts are normally greater than on comparable parts made by other processes (machining, etc.). Therefore, we have designed the internal radius to be slightly oversize. Furthermore, it has been found that if the radius of the hub 38 slightly exceeds the radius of the outer cylindrical surface of the tube, the hub will be better able to conform to the surface of the exterior of the tube. In the preferred form of the invention the tubing is stainless steel and therefore the extruded aluminum will conform to the surface of the harder stainless steel.

Thus when the locking members are forced over one another, the cylindrical surface 52 is able to closely conform to the outer cylindrical surface of the tubing so as to minimize the thermal contact resistance between the tubing and the hub. If the radius of the arcuate portion 52 were smaller than the radius of the conduit (or undersized), the hub 38 would not as readily conform to the surface of the conduit. It is therefore preferable to design the hub to be slightly over-sized so that the extrusion tolerances can be taken into consideration and so that the hub will always readily conform to the tubing.

The arcuate portion 58 of the short locking member 53 is formed so that the outer member 64 of the adjacent vaporizer part will be able to bend arcuately about the short member. This is done in order to reduce sharp bends in the member 64 which would be subject to failure. The dimension A of base member 62 is of course greater than the dimension B of the short member 53 in order that the outer member 64 may clear the rounded surface 59 and be formed around the short member 53. Arcuate surface 60 of short member 53 is formed in order that the thickness indicated by the dimension C is equal to the thickness of the long locking member 54, indicated by the dimension D. This is done in order that the spring back forces which will result from the forming process will be equal in both the short and long locking members. By causing the spring back forces to be substantially equal, the locking members will play an essentially equal role in generating the clamping force on the tubing. Thus when cryogenic liquid is pumped through the tubing 71 and the stainless steel conduit contracts slightly due to its low temperature, the spring back forces will maintain the cylindrical surfaces 52 in contact with the exterior surface 70 of the conduit. This inherent resiliency in our locking technique therefore allows for variations in tolerances and for variations in dimension caused by cryogenic temperature. The methods and apparatus for forming will be discussed in detail below following the discussion of other embodiments of the invention.

Figure 5:
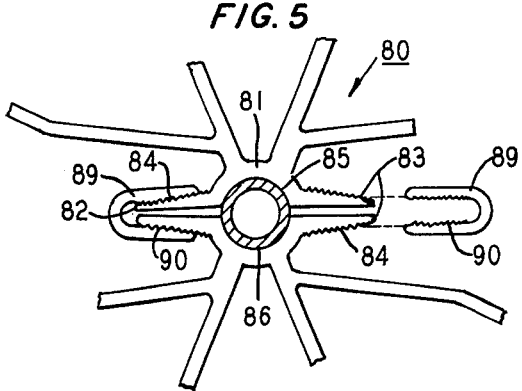
FIG. 5 is an end view, partly in section, partly broken away, of a pair of extrusions about to be coupled together in accordance with the principles of another embodiment of the present invention.

In FIG. 5 there is illustrated a further embodiment of the present invention which utilizes a pair of identical vaporizer parts 80 which are to be locked about a fluid carrying conduit. The hub 81 of each of the parts is formed with substantially oppositely extending locking members 82, 83. On one surface of each of the locking members 82 and 83 there are formed serrations or projections indicated by 84. In the preferred form the inner cylindrical surface 85 is formed with an arc slightly less than 180°. A pair of identical parts 80 are placed around the conduit 86 in such a manner that the locking projections 83 and 84 lie alongside adjacent locking projections on the adjacent part. When this has been done a locking clamp 89 is forced over each pair of adjacent locking members and the locking clamp 89 is driven substantially radially inwardly so that the locking members are clamped together. The clamp 89 is formed with inner serrations or projections 90 which pass over the serrations 84 and which are so angled so as to prevent the removal of the clamp 89 from the locking members 83 and 84 when the clamp is fully seated thereon. In the embodiment shown in FIG. 5 the inner radius of the hub 81 is again made to be slightly larger than the radius of the exterior of the conduit 86 so as to obtain the same result as discussed above in connection with FIG. 4. Thus the clamps 89, which may be forced on by form rolling, exert a resilient clamping force on the hubs 81 so that they conform to the surface of the tubing. The parts 80 may be made from extruded aluminum sections and the locking clamps 89 may also be made from aluminum.

Figure 6A:
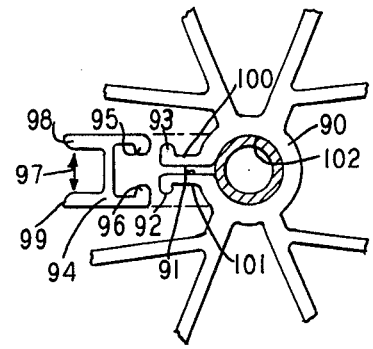
FIG. 6A is a cross sectional view of an extruded ambient air vaporizer section about to be coupled to a conduit in accordance with the principles of a still further embodiment of the present invention.

In FIG. 6A there is illustrated a still further embodiment of the present invention in which the hub 90 is formed of one piece and is split as indicated at 91 in a longitudinal direction. The hub 90 has an arc slightly less than 360° (2° – 5°). A pair of lugs 92 and 93 are formed integral with the hub and extend substantially radially from the portion which has been split. A clamping mechanism 94 is adapted to engage the radially extending lugs 92 and 93 and by this device the hub is clamped to the tubing 102. The clamping device 94 is preferably as long as the hub section 90 so that a clamping force on the lugs 93 and 92 will be exerted substantially along the entire length of the hub 90. The clamping member 94 has an I beam configuration with projecting lugs 95 and 96 which lock about the lugs 92 and 93 on the hub. By forcing the arms 98, 99 of the I beam apart as indicated by 97, the lugs 95 and 96 can be made to contact seats 100 and 101 to force the lugs 92 and 93 toward one another, thus clamping the hub 90 about the tubing 102. The conduit 102 is actually slid into the hub 90 before the clamping device is applied. The clamping device, which is preferably made from aluminum is also slid into position on the hub prior to clamping. As in the case of FIGS. 4 and 5 the internal radius of the hub is made slightly greater than the radius of the external cylindrical surface of the conduit 102 for the reasons stated above.

Figure 6B:
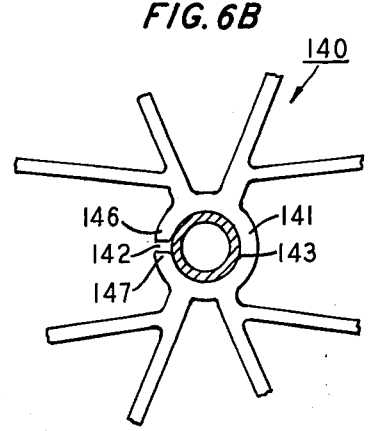
FIG. 6B is an end view, partly in section, partly broken away, of a still further embodiment of the present invention.

In FIG. 6B there is illustrated a still further embodiment of the present invention. The vaporizer section 140 is formed from a single extrusion, the hub 141 being split longitudinally at 142. In this embodiment the clamping force on the conduit 143 is exerted by the hub 141 itself. The split portion of the hub is forced open slightly to allow the insertion of the conduit 143. When the conduit is fully inserted the hub is allowed to close around the conduit 143. Portions 146 and 147 constitute locking members which wrap around the conduit. The inherent spring back characteristics of the hub keep it locked to the conduit. In this embodiment the internal radius of the hub 141 is preferably the same as or slightly smaller than the radius of the external surface of the conduit. Due to the hardness of the stainless steel conduit, the softer inner aluminum surface of the hub readily conforms to the conduit to obtain good heat transfer.

Figure 7:
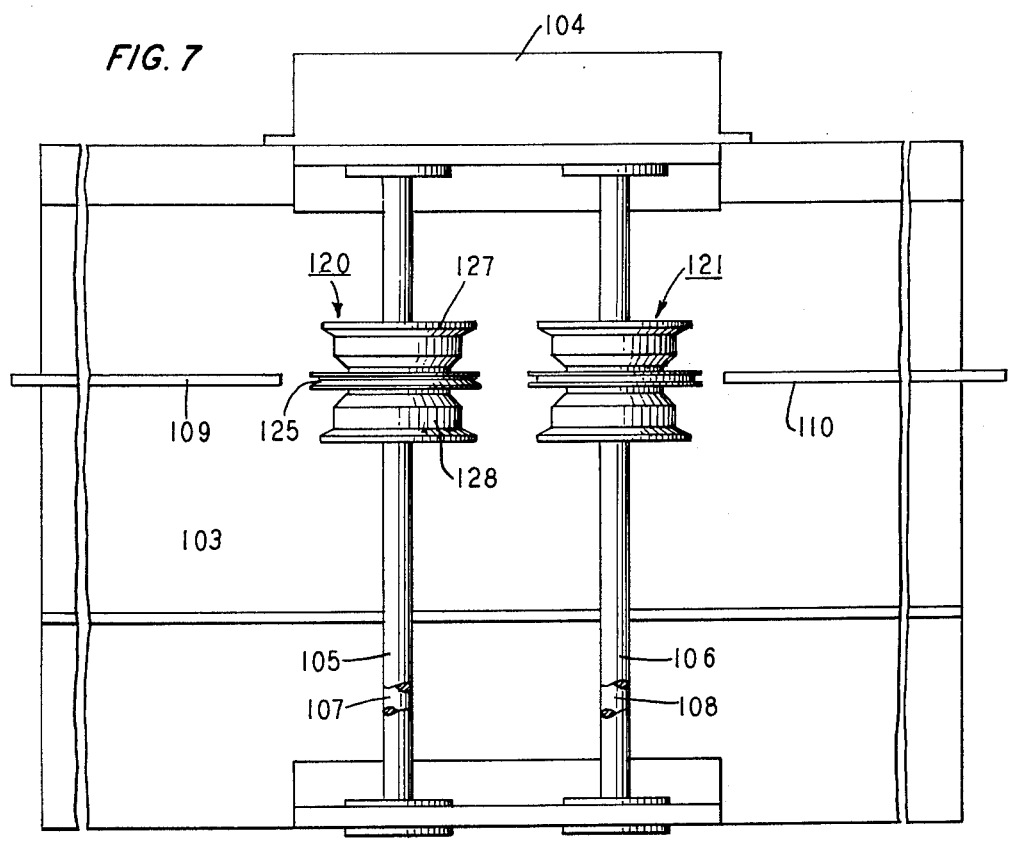
FIG. 7 is a plan view, partly broken away, of apparatus for locking together the sections of ambient air vaporizer made in accordance with the present invention.
Figure 8:
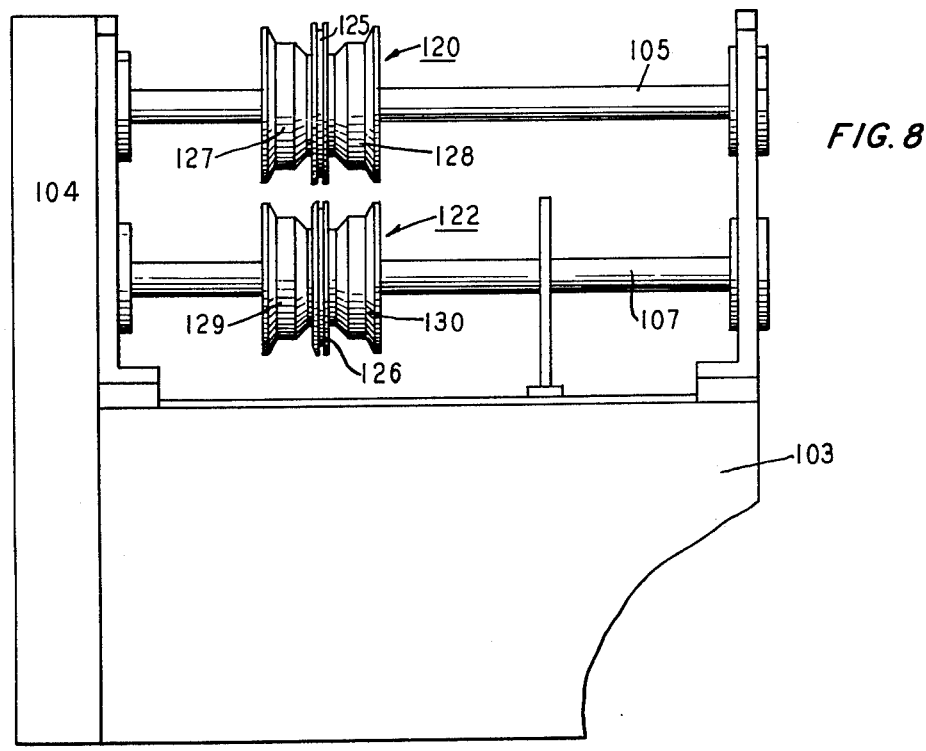
FIG. 8 is an elevational view, partly broken away, of the apparatus shown in FIG. 7.

In FIG. 7 there is illustrated an apparatus for forming the ambient air vaporizer described in connection with FIG. 4. The apparatus takes the form of a suitable supporting stand 103 on which is mounted a drive mechanism 104 and a plurality of bearing assemblies which rotatably support four shafts, 105 through 108. Directly beneath the shafts 105 and 106 are shafts 107 and 108. All of the shafts are drivably connected to a drive means inside drive housing 104. This housing contains a motor connected to suitable gearing, etc., for rotating the upper shafts 105 and 106 in the same direction and at the same speed. The drive mechanism drives the lowermost shafts 107 and 108 at the same speed and in the same direction but in a direction opposite to that of the upper driveshafts 105 and 106. Guide plates 109 and 110 are vertically mounted on the supporting stand 103 and are positioned to guide the vaporizer parts and the associated tubular conduit into the forming rollers indicated by the reference numerals 120 and 121. Two pairs of forming rollers are utilized each having an upper forming roller and a lower forming roller, as illustrated in FIG. 8. Each of the forming rollers is composed of a plurality of interlocked wheel-like members of varying radius and configuration.

In assembling the ambient air vaporizer described in FIG. 4 the identical parts are positioned around the central conduit tube and the locking members are placed in a substantially vertical position. The assembly is then placed on guide plate 109 in such a manner that one of the outer members 64 rests on the surface of the guide plate 109. The assembly is then slid along the plate 109 and is passed between the forming rollers 120 and 122. The locking members are engaged by forming rolls 125 and 126 as indicated in FIG. 9. The radial tip portions of the vaporizer fins engage portions of the forming rolls 127 through 130 as shown at 150–157. By contacting the tips of the vaporizer fins with the forming rolls as shown, the vaporizer parts are held in place while the main forming rollers 125 and 126 form the outer member 64 about the fixed locking member 53. The first set of forming rollers encountered bend the outer members 64 45° and into contact with the arcuate surface of the fixed locking member. The next set of forming rollers which the vaporizer section encounters is located directly behind the forming rolls indicated in FIG. 8. This set of forming rolls completes the bending of outer members 64 so that they fully conform to the arcuate surface 72 on the fixed locking member. The shape of the forming rolls for accomplishing this is indicated in FIG. 10. They have a channel shaped groove 144 which further bends the outer member 64 inwardly. Supporting rolls (158–161) similar to those disclosed in FIG. 8 (127 through 130) are used with the second set of forming rollers to support the radial tips of the fins.

As the vaporizer section leaves the second set of forming rolls and rides on guide plate 110, it can be inspected to determine whether or not the forming has been completely accomplished and whether or not the identical parts of extended surface material are completely fixed to the conduit in the manner desired. The drive mechanism 104 is therefore made reversible in order that, if desired, the sections of vaporizer may be run back and forth through the rolling mechanism. The details of the drive mechanism and of the bearing structure supporting the shafting for the roll forming mechanism have not been described in detail in that they are conventional in nature.

A roll-forming mechanism comparable to that disclosed in FIGS. 7 through 10 may be utilized to assemble the embodiment disclosed in FIG. 5 and in FIG. 6A. That is, forming rollers force clamping devices 89 over the lugs 83, 84 which extend from the hub section of the vaporizer. In FIG. 6A a roller may be used to force arms 98 and 99 apart.

Figure 11:
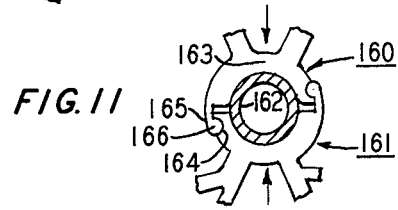
FIG. 11 is an end view, partly in section, partly broken away, of a still further embodiment of the invention.

In FIG. 11 there is illustrated a still further embodiment of the present invention. Identical parts 160 and 161 are formed from extruded aluminum and are clamped about a tubular conduit 162. Each part is made up of a hub portion 163 and two locking members, a partially cylindrical recess 164, and a snap lock 165. The snap is formed from an extension of the hub and has a rod shaped element 166 which snaps into the recess 164. The connection between the element 166 and the hub has sufficient flexibility and resiliency to allow the element to snap into the recess and thus the two parts 160 and 161 may be placed around the conduit 162 and snapped in place. The internal radius of the hub 163 is made slightly greater than that of the conduit 162 for the same reasons as stated above in connection with FIGS. 4, 5 and 6A. Thus the parts 160 and 161 are resiliently coupled to the conduit. Forming rollers may be utilized to affect the snap coupling of the embodiment shown in FIG. 11. By forcing the parts together as shown by the arrows the snap connection may be made.

When the vaporizer sections have been assembled as described above, they may be mounted in a supporting framework so that they may be transported and mounted at a customer station. It is evident that since stainless steel conduit is used and since a steel framework is usually employed to form the supporting structure, the stainless steel conduit may be affixed by means of clamps or struts to the supporting structure of the framework. In the embodiments shown the aluminum extended fin surface expands and contracts at will without affecting the structural mounting between the tubing and the support structure. In all of the embodiments the aluminum fin structure may expand or contract radially or axially at will but will always conform itself to the exterior surface of the stainless steel tube.

It has been found beneficial to coat the entire surface of each of the aluminum parts with a thin layer (0.001–0.100 inches) of fluorocarbon material such as for example, Teflon, Coracone, Dynar, etc. This coating presents a very good appearance, substantially reduces the frost-up which normally occurs, and has been found to only slightly reduce the anticipated heat transfer rate of the vaporizer. The coating may even be applied to the internal cylindrical surface of the hub in that the layer is so thin that only a temperature drop of 1° or 2° has been encountered across this film. The fluorocarbon film is mechanically strong and touch, resistant to low temperature, and to most chemicals and solvents and as mentioned above, greatly reduces the frost-up encountered in this type of unit.

The present invention may be utilized not only with the manufacture of ambient air vaporizers, but with the manufacture of any other device or structure calling for the attaching of one part to the outside of another part. Thus the invention may be used in the manufacture of many types of heat exchangers. It may be used to couple insulation or decorative material to piping or conduits.

To those skilled in the art to which our invention relates, many changes in construction and widely differing embodiments and applications of the invention may suggest themselves without departing from the spirit and scope of the invention. Our disclosure and the description herein are purely illustrative and are not intended to be in any sense limiting.

We claim:

1. A method of clamping a pair of identical finned assemblies to a tubular member comprising, placing said assemblies on said tubular member, simultaneously bending a movable member on each of said assemblies over a fixed member on the other of said assemblies so that said assemblies are locked to said member.

2. The method of claim 1 further comprising bending said movable members still further over said fixed members in a second bending step.

* * * * *